United States Patent Office.

BENJAMIN C. TILGHMAN, OF PHILADELPHIA, PENNSYLVANIA.

*Letters Patent No. 70,485, dated November 5, 1867; antedated October 26, 1867.*

IMPROVED MODE OF TREATING VEGETABLE SUBSTANCES FOR MAKING PAPER-PULP.

*The Schedule referred to in these Letters Patent and making part of the same.*

Be it known that I, BENJAMIN CHEW TILGHMAN, of Philadelphia, Pennsylvania, have invented new and useful Improvements in Treating Vegetable Substances, and obtaining products therefrom applicable to the manufacture of paper, paper-pulp, fibres, and other purposes; and I declare the following to be a full description thereof.

My invention consists in a process of treating vegetable substances which contain fibres with a solution of sulphurous acid in water, heated in a close vessel under a pressure sufficient to retain the acid gas until the intercellular incrusting or cementing matter existing between the fibres is dissolved, either partially or wholly, as may be desired, and a fibrous product is obtained suitable for the manufactur of paper-pulp, or of fibres, or for other uses, according to the nature of the material employed.

I have found that the addition of sulphite or bisulphite of lime, or other suitable base, to the acid solution, tends to make the fibrous product of a whiter color, and more easily bleached.

The following is a method of carrying my invention into effect, taking for example the case of hemlock or poplar wood to be used for paper-pulp.

The whitest parts of the wood are to be selected to make white paper, and it is to be cut across the grain into slices about one-eighth to one-quarter of an inch long. A strong iron vessel, of any convenient size and shape, lined with lead, and provided with a steam-jacket, and with the necessary pipes, cocks, and man-holes for filling and emptying the charge, and with gauges, safety-valves, and thermometers, to indicate height of liquid, pressure, and temperature, is about two-thirds filled with the sliced wood. A solution of sulphurous acid in water, of about specific gravity 1.025 to 1.035, in which a quantity of sulphite of lime has been dissolved, sufficient to raise its density to about specific gravity 1.07 to 1.08 is then run in until the vessel is nearly full, allowing for the absorption of the liquid by the wood and its expansion by heat, so that the wood may be kept constantly covered by the liquid during the operation. The vessel is then closed, and heat is applied by means of the steam-jacket until the temperature of the liquid is about two hundred and sixty degrees Fahrenheit, (260° Fahrenheit,) at which it is kept during about six to eight hours. The steam is then shut off from the steam-jacket and fresh water is forced into the top of the vessel, the acid solution being at the same time allowed to escape gradually from below into a covered lead-lined tub, where it is boiled by steam until the sulphurous acid gas is expelled. This gas is conveyed by a pipe to a suitable condenser, where it is absorbed by cold water, to be reused on another charge of wood. A quantity of sulphite of lime will generally be deposited during the boiling, which may be reused. Instead of driving off the sulphurous acid gas by boiling, or after part of it has been thus driven off, the acid may be neutralized by the addition of hydrate of lime, forming sulphite of lime, which can be reused. After being washed, the woody substance is left to drain, and then, if on examination it is thought necessary in order to complete the separation and bleaching of the fibres, it is to be again treated with a fresh charge of sulphurous acid and sulphite at a temperature of about two hundred and sixty to two hundred and eighty degrees Fahrenheit (260° to 280° Fahrenheit) during about three to five hours. Then the acid liquid is to be run off as before, and the fibrous product is washed until all the acid and soluble matters are extracted. It is then taken out of the lead-lined vessel and beaten into pulp by the ordinary machines. If not sufficiently white, it is to be bleached in the usual manner.

When making pulp for ordinary paper, I prefer that the treatment should be repeated as often as necessary with fresh acid solutions, until everything soluble has been extracted from the wood, so as to leave the fibres clean, and separable into pulp by a slight mechanical rubbing. Many kinds of vegetable fibrous substances are considerably bleached by this treatment. The whiter varieties of some woods, hickory and hemlock for example, become almost perfectly white. The action of the acid solution in dissolving the intercellular or cementing matter appears to be gradual and progressive, first loosening the substance into coarse fibres, and then reducing these into finer and still finer constituents, until perfect pulp is produced. Wood or other vegetable fibrous substance, treated so as to dissolve its cementing matter only partially, will be found capable of being reduced by mechanical beating and rubbing to a mass of fibres, or sort of coarse pulp, applicable to uses where strength and stiffness are desired, such as wrapping-paper, pasteboard, mill-board, papier-mache, &c. The solvent action of the hot acid liquid on the wood may be made more rapid by causing it to circulate freely through the pores of the mass by any of the usual methods, either mechanical, such as pumps, stirrers, or agitators, or by causing a column of the liquid to be more highly heated than the rest, so as to rise to the top and diffuse itself, or, where the scale of manufacture is sufficiently large, by having several vessels filled with the materials, through which the hot acid liquid is forced to pass in succession, so that fresh acid solution is applied to wood already nearly exhausted of soluble matter, and the nearly saturated acid solution is brought into contact with fresh wood. These arrangements are familiar to chemical engineers, and need not be further described.

When making paper-pulp of cane, bamboo, or palmetto, or of esparto or other grasses, or of straw, reeds, or other annual plants, the operation is performed as already described, and they are generally more rapidly acted on than wood. Cotton, linen, and hempen rags, ropes, &c., may be advantageously treated in this manner, and will be rendered more easy to reduce into pulp by the usual mechanical means.

I prefer with all kinds of materials to operate at as low a temperature and with as weak acid solutions as is compatible with a practical rapidity of working.

When flax, hemp, or other long-fibred plants are to be treated to obtain fibres for spinning, I operate in the manner above described, but to avoid too much disintegration and weakening of the fibre, care must be taken to graduate the extent of the action according to the nature of the material used and the effect desired to be produced.

The dissolving action of the acid solution appears to take effect first upon the matter cementing the long compound fibres to each other and to the stem of the plant, and next attacks the cementing matter of the long compound fibres themselves, reducing them into a number of shorter and finer fibres. If the action is still longer continued, these are still further disintegrated, and become at last so short and fine as to be unfit for spinning, and suitable for paper-pulp. If, on the other hand, the dissolving action is not carried far enough, the long fibres do not separate readily from each other and from the stem and skin of the plant. The attention of the operator must therefore be given to arrest the action at the precise point most suitable for the object he has in view, whether a fibre as strong as possible, even, though somewhat less fine and less easy to clean, or a finer and cleaner fibre, but somewhat shorter and weaker. Different kinds of plants, and of different degrees of maturity, require different degrees of action of the solvent liquid in order to produce a given result. I therefore follow the progress of the operation, and ascertain when the desired degree of disintegration is obtained by taking samples from time to time by means of a rod ending in a cork-screw, and working through a stuffing-box and stop-cock in the side of the vessel, as is well understood by engineers.

In order to render the operation more gradual, I prefer to work at comparatively low temperatures, say about two hundred to two hundred and twenty degrees Fahrenheit, (200° to 220° Fahrenheit,) and with very weak solutions of sulphurous acid of about specific gravity 1.002 to 1.004, to which is added a quantity of sulphite of lime, sufficient to raise its density to about 1.005 to 1.008 specific gravity.

Under these conditions I have obtained a medium degree of loosening and separation of the fibre of flax in about four hours. It is desirable that plants of nearly uniform size and growth should be selected to be operated on together, and they are to be left of their natural length, and not cut, as in the case of wood, for paper-pulp. When about to treat a new material, I prefer to ascertain by preliminary trials on small quantities the length of time and degree of action best adapted to the object desired, which can afterwards be adhered to.

When the treatment is finished, the acid and soluble matters are to be thoroughly washed out, and the fibres are to be manufactured in the usual manner.

Straw, grasses, osiers, young woods, and similar vegetable fibrous substances treated in this manner, so as to dissolve only partially the cementing matter of their fibres, will become more flexible and more suitable for making hats, mats, baskets, and hoops, and for other uses where pliability is required.

I do not confine myself to the kind of apparatus above described, which forms no part of my invention, or to the particular mode of working detailed, as my invention can be carried into effect in any convenient method and apparatus by which the substance which contains the fibre can be digested in a hot solution of sulphurous acid, in a close vessel, under pressure, so as to prevent the escape of the acid gas. Many forms of apparatus are in common use, or have been described and published, for washing and bleaching fibrous substances, and for making paper-pulp, by boiling or digesting rags, wood, straw, &c., in hot alkaline and other solutions, which can readily be adapted to working my invention by chemical engineers.

The volatility of the acid, and its corrosive action on metals, must be provided for, and the inside of the apparatus should be lined with lead or other suitable material.

The vessels used when operating with the acid solutions and temperatures above described for treating wood for paper-pulp, should be of about the strength usually allowed for steam-boilers working at a pressure of one hundred pounds per square inch.

I have stated the density of acid solution, the degree of heat, and the length of time which I prefer in practice, but I do not confine myself thereto, as these conditions may be greatly varied, and may to some extent be substituted for each other.

The stronger the acid solution the more rapid is the action at a given temperature. Also, the higher the temperature the more rapid is the action with a given density of acid solution. With weak acid and comparatively low temperature, the effect can be produced by continuing the digestion a sufficiently long time. Or by using a solution saturated when cold with acid gas at or above common atmospheric pressure, the action may be made more rapid.

Care must be taken, however, that the temperature be not raised high enough to cause a blackening action on the vegetable substance, which is apt to take place with some materials at about three hundred degrees Fahrenheit, (300° Fahrenheit,) and more readily in the treatment with the first charge of acid than with the succeeding ones.

I consider it more prudent to work the first charge on wood at not over two hundred and sixty degrees Fahrenheit, (260° Fahrenheit,) and the subsequent charges at not over two hundred and eighty degrees Fahrenheit, (280° Fahrenheit.)

I have found that in the second and subsequent doses of acid solution on a charge of wood, a smaller proportion of sulphite may be used than in the first dose.

Where the first extraction has very nearly exhausted the soluble matter, I have sometimes used solution of sulphurous acid alone, without any sulphite for the subsequent doses. The solution of sulphurous acid in water at the requisite temperature appears to be the efficient agent in dissolving the intercellular or cementing matter of the vegetable fibrous substance, and where the color of the product is of no consequence, the operation may be performed with the sulphurous acid solution alone, without the addition of sulphite. In this case a reddish brown color is given to the resulting fibrous product, and the acid solution will be found to contain a quantity of free sulphuric acid, which has been formed during the operation by the oxidation of a portion of the sulphurous acid. The presence of a sulphite in the acid solution prevents this reddening effect, and in case of many substances a considerable bleaching of the fibrous product takes place.

The probable mode of action of the sulphite is to present a base with which the sulphuric acid combines as soon as it is formed, and is thus prevented from further action.

There are other classes of salts which operate to some extent in the same way as the sulphites, but are less cheap and convenient. The requisites are, first, that the salt should not be capable of being decomposed by the solution of sulphurous acid at the temperature and pressure employed; second, that it should be capable of being decomposed by a weak solution of sulphuric acid at the temperature and pressure employed; third, that the acid thus set free should not have the property of coloring the fibre at the temperature and pressure employed.

Many of the salts of the weaker acids (acetates for example) would fulfill these conditions to a considerable extent, but as they are more expensive than the sulphites, there is no inducement to use them.

Besides its cheapness, the sulphite of lime has the advantage of furnishing an equivalent of sulphurous acid when decomposed by the sulphuric acid, and is also very readily recoverable from the spent acid solutions.

I prefer to use a quantity of sulphite of lime, sufficient to insure that some of the salt shall be present in the acid solution during the whole operation, and that some shall remain undecomposed after the action on the fibrous substance is completed.

I have sometimes used solutions of sulphurous acid saturated with sulphite, and sometimes have used sulphite in powder mixed among the wood, &c., operated upon. After the sulphurous acid has been driven off or precipitated, the liquid extract containing in a soluble form the products of the saline and intercellular or cementing constituents of the plants may be utilized in various ways in the arts, or may be used as manure. It contains a weak organic acid, somewhat resembling ulmic acid, and when boiled down has some of the properties of gum.

What I claim as my invention, and desire to secure by Letters Patent, is—

The process of treating vegetable substances which contain fibres with a solution of sulphurous acid in water, either with or without the addition of sulphites, or other salts of equivalent chemical properties, as above explained, heated in a close vessel under pressure to a temperature sufficient to cause it to dissolve the intercellular incrusting or cementing constituents of said vegetable substances, so as to leave the undissolved product in a fibrous state, suitable for the manufacture of paper, paper-pulp, cellulose, or fibres, or for other purposes, according to the nature of the material employed.

I also claim as new articles of manufacture, the two products obtained by treating vegetable substances which contain fibres with a solution of sulphurous acid in water, either with or without the addition of sulphites or other salts of equivalent chemical properties, as above explained, heated in a close vessel under pressure to a temperature sufficient to cause it to dissolve the intercellular or incrusting constituents of said vegetable substances, one of said products being soluble in water, and containing the elements of the starchy, gummy, and saline constituents of the plants, and the other product being an insoluble fibrous material applicable to the manufacture of paper, paper-pulp, cellulose, or fibres, or to other purposes, according to the nature of the material employed.

I also claim the use and application, in the manufacture of paper, paper-pulp, cellulose, and fibres, of the fibrous material produced by treating vegetable substances which contain fibres with a solution of sulphurous acid in water, either with or without the addition of sulphites, or other salts of equivalent chemical properties, as above explained, heated in a close vessel under pressure to a temperature sufficient to cause it to dissolve the incrusting or intercellular constituents of said vegetable substances.

I also claim the use and application of sulphites or other salts of equivalent chemical properties, as above explained, in combination with a solution of sulphurous acid in water, as an agent in treating vegetable substances which contain fibres, when heated therewith in a close vessel under pressure to a temperature sufficient to cause said acid solution to dissolve the intercellular or incrusting constituents of said vegetable substances.

I also claim the recovery and reuse of sulphurous acid and sulphite from the acid liquids which have been digested on the vegetable fibrous substances, by boiling said liquids, or neutralizing them with hydrate of lime.

B. C. TILGHMAN.

Witnesses:
ANNA TILGHMAN,
MARIA TILGHMAN.